Oct. 9, 1923.

C. D. PETTIS

BRAKE SHOE

Filed Sept. 2, 1922

1,470,472

Inventor:
Clifton D. Pettis,
By Fisher, Towle, Clapp & Soans
Attys.

Patented Oct. 9, 1923.

1,470,472

UNITED STATES PATENT OFFICE.

CLIFTON D. PETTIS, OF NEW YORK, N. Y.

BRAKE SHOE.

Application filed September 2, 1922. Serial No. 585,900.

*To all whom it may concern:*

Be it known that I, CLIFTON D. PETTIS, a citizen of the United States, and a resident of New York, in the county of New York and State of New York, have invented certain new and useful Improvements in Brake Shoes, of which the following is a specification.

This invention relates to brake shoes, but more particularly to ductile metal attaching lugs for securing the shoe upon the brake head, and has for its primary object to provide a lug for this purpose which is simple, strong and durable in construction and economical to produce.

The many other objects and advantages of my invention will be better understood by reference to the following specification when considered in connection with the accompanying drawing illustrating a selected embodiment thereof in which:—

Figure 1:
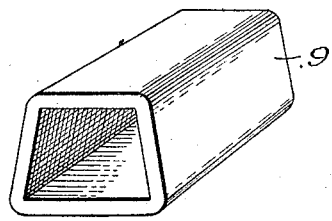
Fig. 1 is a perspective view of the attaching lug blank.
Figure 2:
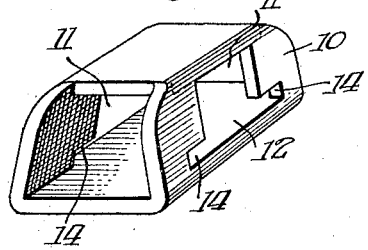
Fig. 2 is a perspective view of the finished lug.

Referring to the drawing, the lug 9 is preferably formed from a blank consisting of a seamless tube 10 of ductile metal of proper length and shape, as shown in Fig. 1. Alined keyway apertures 11 are then punched or otherwise formed in the blank and alined slots 12 are similarly provided to admit the reinforcing back or plate 13. In the present embodiment these slots 12 are formed by providing oppositely disposed notches 14 in the lower portion of the side edges of the keyway apertures. The lug 10 is placed upon the reinforcing back or plate by inserting the plate endwise into the slots 12 and sliding the lug into position.

Figure 3:
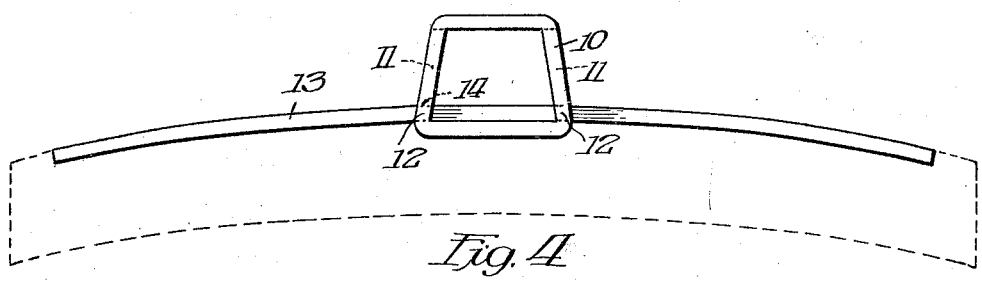
Fig. 3 is a side elevation of the reinforcing back with the lug in place thereon.
Figure 4:
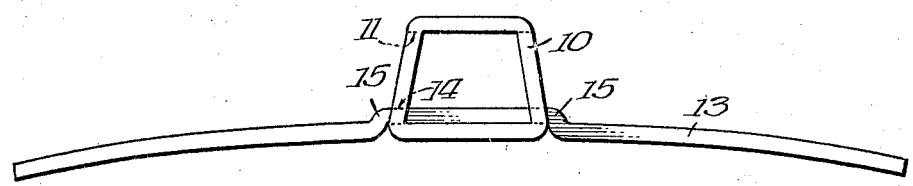
Fig. 4 is a side elevation of a modified form of reinforced back with the lug in place thereon.

The lug may be initially secured in position upon the reinforcing plate in various ways but I have found that this may be accomplished satisfactorily by bending the plate at 15 on opposite sides of the lug (Fig. 4). This insures that the lug will not become displaced in the operation of casting on the brake shoe body shown in dotted lines Fig. 3, but it is not necessary for the cast metal will firmly hold the lug in position in the finished shoe.

It is obvious that my improved lug is simple, strong and durable in construction, quickly and easily applied, and economical to produce.

I am aware that the form and method of production of my attaching lug may be considerably varied without departing from the spirit of my invention and I reserve the right to make all such as fairly fall within the scope of the following claims.

I claim as my invention:

1. A brake shoe comprising a reinforcing back, a tubular attaching lug provided with alined slots in the walls thereof to receive said back, and a body cast on said back.

2. A brake shoe comprising a reinforcing back, an attaching lug substantially tubular in form provided with alined keyway apertures in the tubular walls thereof and alined slots in said walls to receive said back, and a body cast on said back.

3. A brake shoe comprising a reinforcing back, a tubular attaching lug of ductile metal having its axis extending substantially transversely of said back and provided with alined keyway apertures in the tubular walls thereof, the side edges of each of said apertures being oppositely notched to form alined slots to admit said back, and a body cast on said back.

4. A brake shoe comprising a reinforcing back, an attaching lug of ductile metal substantially tubular in form and provided with alined keyway apertures in the walls thereof and alined slots in said walls, said lug being attached to said back by inserting the back longitudinally into said slots, and a body cast on said back.

5. A brake shoe comprising a reinforcing back, an attaching lug of tough ductile metal tubular in form and provided with alined keyway apertures in the tubular walls and alined slots in said walls, and a body cast on said back, said lug being attached to said back by the insertion of the back endwise into said slots and held in position thereon by the cast metal body.

6. In a brake shoe, the combination with a reinforcing back, of an attaching lug formed from a tubular blank having alined keyway apertures and alined back receiving slots punched in its tubular walls.

7. A brake shoe comprising a reinforcing back, an attaching lug of tough ductile metal tubular in form and provided with alined key-way apertures in the tubular walls and alined slots in said walls, said lug being attached to said back by inserting the back longitudinally into said slots and then bending the back on opposite sides of the lug, and a body cast on said back.

CLIFTON D. PETTIS.